United States Patent [19]

Watanabe

[11] 4,206,253

[45] * Jun. 3, 1980

[54] METHOD OF STRENGTHENING CHEMICALLY A GLASS CONTAINER

[75] Inventor: Muneo Watanabe, Nishinomiya, Japan

[73] Assignee: Yamamura Glass Kabushiki Kaisha, Nishinomiya, Japan

[*] Notice: The portion of the term of this patent subsequent to May 3, 1994, has been disclaimed.

[21] Appl. No.: 913,694

[22] Filed: Jun. 8, 1978

Related U.S. Application Data

[63] Continuation of Ser. No. 747,249, Dec. 2, 1976, abandoned.

[30] Foreign Application Priority Data

Jun. 4, 1976 [JP] Japan .................................. 51-64563

[51] Int. Cl.$^2$ ............................................. B05D 3 /02
[52] U.S. Cl. .................................... 427/236; 427/230; 427/380; 427/422; 427/427; 427/430.1
[58] Field of Search ................... 427/230, 235, 374 R, 427/236, 380, 422, 427, 430 R

[56] References Cited

U.S. PATENT DOCUMENTS 3,498,773   3/1970   Grubb et al. .............................. 65/60

*Primary Examiner*—Bernard D. Pianalto
*Attorney, Agent, or Firm*—Wenderoth, Lind & Ponack

[57] ABSTRACT

In a method of strengthening chemically a glass container comprising applying an aqueous solution of potassium salts to a soda-containing glass container to form a potassium salt adhered layer, holding at an ion exchange treatment temperature for a period of time sufficient, then cooling to room temperature and removing the residual potassium salts, the feature consists in using, as the aqueous solution of potassium salts, a concentrated aqueous solution containing a small amount of surfactant and a high concentration of mixed potassium salts consisting of potassium nitrate having a relatively low melting point and at least one potassium salt having a relatively high melting point selected from the group consisting of potassium chloride and potassium sulfate in such a proportion that 10 to 80% by weight of the potassium salts be present in solid phase, when heated at the ion exchange treatment temperature, to prevent the fused potassium salts from flowing off from the surfaces of the glass container, applying the concentrated aqueous solution to the outer surface and inner surface of the glass container at a temperature of lower than that of the concentrated aqueous solution, causing the potassium salts to deposit on the outer surface and inner surface of the glass container by virtue of the temperature difference, then drying and holding the glass container having the mixed potassium salt adhered layer at an elevated temperature below the strain point of the glass but as near the strain point as possible for a period of time sufficient to form a compressive stress layer on the outer surface and inner surface of the glass container.

9 Claims, 1 Drawing Figure

KNO3–KCl–K2SO4

METHOD OF STRENGTHENING CHEMICALLY A GLASS CONTAINER

This is a continuation of application Ser. No. 747,249, filed Dec. 2, 1976, now abandoned.

BACKGROUND OF THE INVENTION

1. Field of the Invention

This invention relates to a method of strengthening chemically glass articles and more particularly it is concerned with a method of strengthening glass articles by effecting an ion exchange reaction using an aqueous solution of mixed potassium salts.

2. Description of the Prior Art

It is known that the intrinsic strength of glass is very high, for example, more than 7,000 $Kg/cm^2$ in the non-scratched state, i.e., "pristine glass", but, when the surface is bruised, the strength is substantially lowered, for example, to about 200 $Kg/cm^2$. When glass articles are handled, for example, during inspecting, bottling, capping, packaging and shipment, the glass articles are brought into contact with each other and thus scratched or bruised, whereby their strength is substantially lowered.

Various proposals have hitherto been made in order to protect glass articles from scratching or bruising and to improve the strength thereof. For example, there has been proposed a method of increasing chemically the mechanical strength of glass by a so-called ion exchange method wherein ions A contained in the glass surface, such as sodium ions, are replaced with ions B having a larger ion radius, such as potassium ions. This chemical strengthening method has been classified into the so-called fused salt immersion method, for example, as disclosed in Japanese Patent Publication No. 49298/1972, in which a glass article is contacted with, for example, a potassium salt bath and the sodium ions are replaced with the potassium ions, and the so-called aqueous solution application method, for example, as disclosed in Japanese Patent Publication Nos. 6610/1973 and 28674/1965, in which an aqueous solution of a potassium salt is applied to the surface of a glass article by spraying or by another suitable procedure and the glass article is held at a temperature for a period of time, which are sufficient to effect the ion exchange which will produce a compressive stress layer.

The inventors have made various studies on the ion exchange methods by application of adhesion of aqueous solutions, based on the concept that, when the outer surface and inner surface of a glass article having a complicated shape such as a glass bottle are subjected to a chemical strengthening treatment, the ion exchange method by application of an aqueous solution is more feasible on a commercial scale than the ion exchange method by direct application of a fused salt to a glass article (which will hereinafter be referred to as "fused salt method") and consequently have found that the ion exchange method by application of an aqueous solution according to the prior art has still a number of disadvantages. For example, the invention described in Japanese Patent Publication No. 28674/1965 has the disadvantage that, in order to strengthen chemically a glass article by the ion exchange method by application of an aqueous solution, it is necessary to add an inert aggregate carrier such as ochre to the ion exchanging agent and, therefore, many labours are required for removing the adhered substance from the glass article chemically strengthened. On the other hand, the invention disclosed in Japanese Patent Publication No. 6610/1973 is free from the above described disadvantage, but has other disadvantages that analysis of potassium salts as an ion exchanging agent is not completely effected and, when an aqueous solution of a potassium salt as an ion exchanging agent is applied to a glass surface by spraying, the aqueous solution tends to be hydrolyzed to be alkaline and to etch the glass surface, while the flowing-off phenomenon of the fused potassium salt adhered to the glass surface at the ion exchange temperature cannot be prevented.

In Japanese Patent Publication No. 4191/1972, there has been proposed for the purpose of making more adhesive an ion exchanging agent to a glass surface and preventing the ion exchanging agent from flowing off a process for the production of a glass article having a high strength, which comprises applying to a glass surface containing monovalent cations such fused mixed salts as consisting of at least two kinds of salts, forming a paste of a solid phase in a liquid phase through solidification of a part thereof by cooling at a temperature range of lower than the strain point of the glass and containing at least one monovalent cation having a larger radius in the liquid phase of the paste than the cation in the glass, and heating at a temperature of lower than the strain point of the glass for a desired period of time while holding the mixed salts on the glass surface as a coating layer of the above described paste, thereby forming a compressive stress layer on the glass surface. This technique can favourably be assessed as to prevention of the flowing-off phenomenon of an ion exchanging agent at an ion exchange temperature, but has disadvantages that not only the working is accompanied with dangers because of using fused mixed salts as the ion exchanging agent, but also a glass article must be preheated at a relatively high temperature resulting in a difficulty of working because the glass article tends to break if there is a large temperature difference between the glass article and fused salt, although the fused salt adheres fast to the glass article due to the temperature difference.

Since general glass containers, in particular, glass bottles are subjected to severe conditions such as brushing by means of a bottle washing machine before filling, processing with detergents, etc., the inner surface of the glass bottle tends to be scratched, resulting in marked lowering of the strength. In such cases, therefore, it is impossible to keep the strength by strengthening the outer surface of the glass bottle only and it is thus essential to strengthen the outer surface and inner surface of the glass bottle by the ion exchange method. Of the above described known methods, however, the aqueous solution application method as disclosed in, for example, Japanese Patent Publication Nos. 6610/1973 and 28674/1965 and the fused salt method as disclosed in Japanese Patent Publication No. 4191/1965 are not suitable for the ion exchange treatment of both the outer surface and inner surface of a glass article. In the former technique, there is no technical disclosure as to the ion exchange strengthening treatment of the inner surface of a glass container such as a glass bottle and in the latter technique, there is a technical disclosure as to the ion exchange strengthening treatment of both the outer surface and inner surface of a glass container, but, as described above, the working or operation is accompanied with some dangers because of using a fused salt bath and the handling of glass containers at a relatively high temperature results in complication of apparatus used therefor and difficulties in the operation.

SUMMARY OF THE INVENTION

It is an object of the invention to provide a method of strengthening chemically glass articles, in particular, glass containers.

It is another object of the invention to provide a strengthened glass article or glass container having a compressive stress layer on both the outer and inner surfaces.

These objects can be attained by a method of strengthening chemically a glass container, which comprises applying to the outer surface and inner surface of the glass container an aqueous solution containing a small amount of surfactant and a high concentration of mixed potassium salts consisting of potassium nitrate having a relatively low melting point and at least one potassium salt having a relatively high melting point selected from the group consisting of potassium chloride and potassium sulfate in such a proportion that 10 to 80% by weight of the potassium salt be present in solid phase, when heated at an ion exchange temperature, to prevent the fused potassium salt from flowing off from the surfaces of the glass container, the temperature of the glass container being lower than that of the aqueous solution, thereby depositing the potassium salt on the outer surface and inner surface of the glass container through the temperature difference to form a potassium salt adhered layer, then drying, holding the glass container at an elevated temperature below the stain point of the glass but as near the strain point as possible for a period of time sufficient to form a compressive stress layer on the outer surface and inner surface of the glass container, cooling the glass container to room temperature and removing the residual potassium salts.

BRIEF DESCRIPTION OF THE DRAWING

The accompanying drawing is to illustrate the principle and merits of the invention in greater detail.

DETAILED DESCRIPTION OF THE INVENTION

Figure 1:
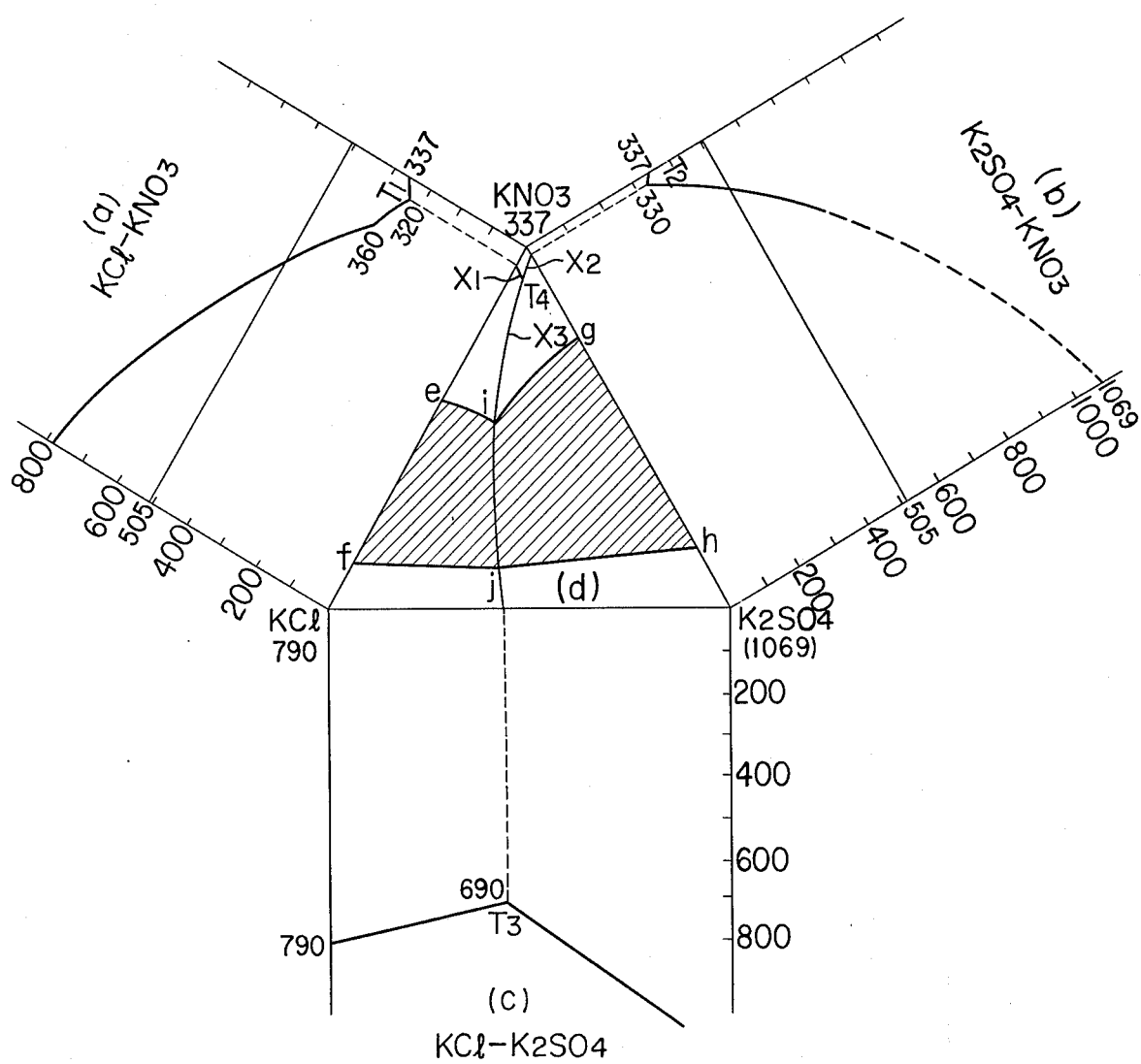
FIG. 1 shows a phase diagram of three component system consisting of $KNO_3$—$KCl$—$K_2SO_4$ in which (a) is $KCl$—$KNO_3$ system, (b) is $K_2SO_4$—$KNO_3$ system, (c) is $KCl$—$K_2SO_4$ system and (d) is a projection on a plane of the three component system of $KNO_3$—$KCl$—$K_2SO_4$.

The inventors have made studies to develop a method of strengthening chemically a glass container such as a glass bottle which is free from the above described disadvantages of the prior art and consequently have found the following facts:

(1) Of a number of potassium salts, potassium nitrate, potassium chloride and potassium sulfate do not etch glass containers, because, even if hydrolyzed in aqueous solution, the hydrolyzed products are neutralized each other. Even if an aqueous solution of such a potassium salt is applied as an ion exchanging agent to a glass container, therefore, the glass container can hold its transparent apperance.

(2) When a concentrated aqueous solution of potassium nitrate having a relatively low melting point and at least one potassium salt having a relatively high melting point selected from the group consisting of potassium chloride and potassium sulfate, being mixed in a specified proportion, is applied to a glass container, the adhesiveness of these salts during the application as well as the wettability during ion exchange treatment are improved and the flowing-off phenomenon of the potassium salts during the ion exchange treatment can be prevented.

(3) When a concentrated aqueous solution of the mixed potassium salts in the above described specified proportion at a relatively high temperature is applied to the surface of a glass container at a relatively low temperature, a part of the potassium salts is deposited through the temperature difference and, accordingly, the adhesion efficiency of the potassium salts during the application is increased.

(4) Since the above described procedure (3) is carried out by applying a concentrated aqueous solution at a temperature of at most 75° C. to the surface of a glass container at a temperature below this temperature, it is possible to cause the mixed potassium salts evenly to adhere to glass containers having complicated shapes such as narrow neck glass bottles with a high efficiency.

The present invention has been completed based on this discovery. That is to say, in accordance with the present invention, there is provided a method of chemically strengthening a glass container comprising applying an aqueous solution of potassium salts to a soda-containing glass container to form a potassium salt adhered layer, holding at an ion exchange temperature for a period of time sufficient, then cooling to room temperature and removing the residual potassium salts, characterized by using, as the aqueous solution of potassium salts, a concentrated aqueous solution containing a small amount of surfactant and a high concentration of mixed potassium salts consisting of potassium nitrate having a relatively low melting point and at least one potassium salt having a relatively high melting point selected from the group consisting of potassium chloride and potassium sulfate in such a proportion that 10 to 80% by weight of the potassium salts be present in solid phase, when heated at an ion exchange temperature, to prevent the fused potassium salt from flowing off from the surfaces of the glass container, applying the concentrated aqueous solution to the outer surface and inner surface of the glass container at a temperature of lower than that of the thickened aqueous solution, causing the potassium salts to deposit on the outer surface and inner surface of the glass container by virtue of the temperature difference, then drying and holding the glass container having the mixed potassium salt adhered layer at an elevated temperature below the strain point of the glass but as near the strain point as possible for a period of time sufficient to form a compressive stress layer on the outer surface and inner surface of the glass container.

In the method of the present invention, from many potassium salts known in the art as an ion exchanging agent, for example, potassium nitrate, potassium chloride, potassium sulfate, potassium carbonate, potassium phosphate, potassium hydrogen phosphate, potassium bromide and potassium iodide are chosen potassium chloride, potassium sulfate and potassium nitrate because these salts do not etch glass surfaces due to the neutralization of the hydrolyzed products in aqueous solution and, therefore, even if an aqueous solution of such a potassium salt is caused to adhere to a glass article as an ion exchanging agent, the glass article can hole its transparent appearance. In the case of using other potassium salts, for example, potassium carbonate, potassium hydroxide formed by hydrolysis tends to etch glass to give an opaque surface and potassium phosphate, potassium hydrogen phosphate, potassium iodide and potassium bromide have the similar tendency.

There will hereinafter be illustrated the reason why these potassium chloride, potassium sulfate and potassium nitrate are mixed in the specified proportion and the quantitative relation of the specified proportion. When using potassium chloride and potassium sulfate having relatively high melting points (potassium chloride: 790° C.; potassium sulfate: 1069° C.) of these potassium salts individually as an ion exchanging agent, the wetting phenomenon to glass surface that the boundary of the glass surface and air is substituted by the boundary of the glass surface and fused salt is so bad at an ion exchange treatment temperature below the strain point of the glass but as near the strain point as possible that not only the ion exchange efficiency is low but also, when or after an aqueous solution of the potassium salt is applied to a glass surface, the adhered layer tends to be peeled. Using potassium nitrate having a melting point much lower than the ion exchange treatment temperature (337° C.) alone, on the other hand, this potassium salt tends to flow off and be lost during the ion exchange treatment, which means that the adhered potassium salt is lost in a quantity of more than the changed quantity by the ion exchange, and consequently the ion exchange treatment is difficult. When at least one of high melting point potassium chloride and potassium sulfate and low melting point potassium nitrate are mixed in a specified proportion as described hereinafter, dissolved in water to prepare a relatively thickened aqueous solution at a relatively high temperature and applied to the surface of a glass container at a relatively low temperature, the adhesiveness of the mixed potassium salts to the glass surface as well as the wetting property at an ion exchange temperature are improved and the potassium salts can be prevented from flowing off during the ion exchange treatment.

This mixed potassium salt of at least one of high melting point potassium chloride and potassium sulfate and low melting point potassium nitrate must be mixed so that a part thereof may remain as solid at an ion exchange treatment temperature. It is found as a result of our many studies that when the mixed potassium salts are fused at an ion exchange temperature and the quantity of the residual solid phase is 10% by weight or less, flowing-off of the fused mixed potassium salts cannot be prevented, and when 80% by weight or more of the solid phase remains, the fused mixed potassium salts in liquid phase are too little to keep the ion exchange efficiency well.

One embodiment of the present invention will now be illustrated in which a soda-lime glass container is subjected to an ion exchange strengthening treatment using mixed potassium salts in such a proportion that 10 to 80% by weight of the solid phase remains at an ion exchange treatment temperature. The ordinary soda-lime glass has a strain point of about 510° C. (510°±10° C.) and the ion exchange strengthening treatment is carried out, for example, at 505° C. being below the strain point 510° C. but as near it as possible considering the changes of the ion exchange strengthening treatment temperature and strain point measuring temperature. In this case, the mixing ratio of at least one of high melting point potassium chloride and potassium sulfate and low melting point potassium is determined as follows.

FIG. 1 shows a phase diagram of three component system $KNO_3$—$KCl$—$K_2SO_4$ in which FIG. 1 (a) is $KCl$—$KNO_3$ system, FIG. 1 (b) is $K_2SO_4$-$KNO_3$ system, FIG. 1 (c) is $KCl$—$K_2SO_4$ system and FIG. 1 (d) is a projection on a plane of the three component system of $KNO_3KCl$—$K_2SO_4$. In FIG. 1, $T_1$ (320° C.), $T_2$ (330° C.), $T_3$ (690° C.) and $T_4$ (300° C.) are respectively the eutectic points of the systems $KCl$—$KNO_3$, $K_2SO_4$—$KNO_3$, $KCl$—$K_2SO_4$ and $KNO_3$—$KCl$—$K_2SO_4$. In FIG. 1 (d), $x_1$, $x_2$ and $x_3$ show the liquid phase lines of the system $KNO_3$—$KCl$—$K_2SO_4$. In FIG. 1 (a), point e is a point where 10% of a solid phase and 90% of a liquid phase are present at an ion exchange treatment temperature of 505° C. in the system $KCl$—$KNO_3$, which represents a composition of $KCl$—$KNO_3$ ($KCl$:$KNO_3$=43:57) in which a minimum solid phase capable of preventing the liquid phase from flowing off is present, and point f is a point where 80% of a solid phase and 20% of a liquid phase are present at the same ion exchange treatment temperature, which represents a composition of $KCl$—$KNO_3$ ($KCl$:$KNO_3$=87:13) in which a minimum liquid phase necessary for increasing the wettability during the ion exchange treatment is present. In FIG. 1 (b), point g represents a composition of $K_2SO_4$—$KNO_3$ ($K_2SO_4$:$KNO_3$=25:75) in which 10% of a solid phase and 90% of a liquid phase are present at the same ion exchange treatment temperature in the system $K_2SO_4$—$KNO_3$ and point h represents a composition of $K_2SO_4$—$KNO_3$ ($K_2SO_4$:$KNO_3$=83:17) in which 80% of a solid phase and 20% of a liquid phase are present at the same ion exchange treatment temperature. In FIG. 1 (d), point i represents a composition of $KNO_3$—$KCl$—$K_2SO_4$, i.e., ($KCl$+$K_2SO_4$):$KNO_3$=50:50 in which 10% of a solid phase and 90% of a liquid phase are present at the same ion exchange treatment temperature in the system $KNO_3$—$KCl$—$K_2SO_4$ and point j represents a composition of $KNO_3$—$KCl$—$K_2SO_4$, i.e., ($KCl$+$K_2SO_4$):$KNO_3$=89:11 in which 80% of a solid phase and 20% of a liquid phase are present at the same ion exchange treatment temperature.

When an ordinary soda-lime glass container having a strain point of about 510° C. (±10° C.) is subjected to an ion exchange strengthening treatment using an aqueous solution of such potassium salts, therefore, a composition within a range of line e-f in FIG. 1 (a) or (d), i.e., $KCl$:$KNO_3$=43:57 to 87:13 should be used in the case of the two component mixed potassium salt $KCl$—$KNO_3$, a composition within a range of line g-h in FIG. 1 (b) or (d), i.e., $K_2SO_4$:$KNO_3$=25:75 to 83:17 should be used in the case of the two component mixed potassium salt $K_2SO_4$—$KNO_3$ and a composition surrounded by e-f-j-h-g-i-e (shaded portion) in FIG. 1 (d) should be used in the case of the three component mixed potassium salt $KNO_3$—$KCl$—$K_2SO_4$.

In the method of the present invention, these mixed potassium salts are generally used in the form of an aqueous solution being as thickened as possible. To this end, the aqueous solution of the mixed potassium salts is preferably heated at such a temperature that a glass container at room temperature or a temperature somewhat higher than room temperature is not affected or broken and it is preferable to use the same as a saturated aqueous solution at that temperature. When such an aqueous mixed potassium salt solution is applied to a glass container, the mixed potassium salts become supersaturated by virtue of the temperature difference and partly deposit. Consequently, the adhesiveness of the mixed potassium salts to the glass container can be effectively improved. The maximum temperature difference between the aqueous mixed salt solution and glass container, depending on the thickness of the glass container, is about 50° C. in the case of thick glass containers (thickness: about 5 mm) and about 70° C. in the case of thin glass containers (thickness: about 2.5 mm). If the temperature difference exceeds this maximum range, glass containers are often broken.

The solubility of the mixed potassium salts is the higher as the aqueous solution is heated at a higher temperature and the deposition effect from the supersaturated state of the aqueous solution is increased with the increase of the temperature difference, but it is still desirable to use a surfactant so as to increase the wettability of the mixed potassium salts to the surface of a glass container. Accordingly, the heating temperature of the mixed salt solution is restricted by the decomposition temperature of the surfaces used. As the surfactant, therefore, there should be used those having a high decomposition temperature, excellent high temperature stability and excellent miscibility with the mixed potassium salts. Useful examples of the surfactant are anionic surfactants such as R—(C$_2$H$_4$O)nOSO$_3$Na wherein R is an alkyl group having 8–18 carbon atoms and n is 6 or less,

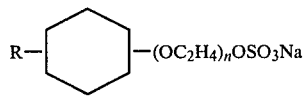

wherein R is an alkyl group having 8–9 carbon atoms and n is 6 or less and R—OSO$_3$Na wherein R is an alkyl group having 8–18 carbon atoms, cationic surfactants such as (RN$^+$(CH$_3$)$_3$)Cl$^-$ wherein R is an alkyl group having 8–18 carbon atoms and ampholytic surfactants such as

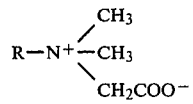

wherein R is an alkyl group having 12–18 carbon atoms. Of these wetting agents, the former two surfactants are preferably used. Such a surfactant may be added to the solution in a proportion of 0.2 to 1.2% by volume.

In the method of the present invention, the aqueous mixed salt solution prepared in this way is applied to both the outer surface and inner surface of a glass container such as a glass bottle held at a temperature below that of the aqueous mixed salt solution. When the surface of a glass container is subjected to an ion exchange strengthening treatment by applying a fused salt as an ion exchanging agent as in the prior art, there is the danger of breakage of the glass container unless the glass container is heated at a considerably high temperature, because the fused salt is generally at a high temperature, and, in particular, application of a fused salt to both the outer surface and inner surface of a glass bottle results in difficulties in holding the glass bottle at a high temperature and handling such a dangerous fused salt. This is very disadvantageous from a commercial point of view. When the ion exchanging agent is used in the form of an aqueous solution according to the present invention, on the contrary, application of the same to a glass bottle can readily be effected without dangers as described above and difficulties in holding the glass bottles.

The mixed salt solution applied to a glass container in this way becomes supersaturated through the temperature difference and thus deposits out partly a relatively dry mixed salt, whereby the mixed potassium salts can be prevented from flowing off and held on the glass container in a considerable quantity. The thus salt coated glass container is then dried to form effectively a mixed potassium salt adhered layer. If a desirable quantity of the mixed potassium salt layer is not formed on the surface of a glass container by only one application, the same aqueous mixed salt solution can repeatedly be applied to the glass container after drying to obtain the desirable mixed potassium salt layer.

The glass container on which a desirable quantity of the ion exchanging agent is thus formed as an adhered layer is then held at or below the strain point of the glass but as near the strain point as possible for a period of time sufficient to form a compressive stress layer on both the outer surface and inner surface of the glass container. The reason why the glass container is heat treated at an elevated temperature below the strain point but as near the strain point as possible is as follows. That is to say, when the ion exchange strengthening treatment comprising diffusing potassium ion larger than sodium ion through the surface of the glass container is carried out at a temperature below the strain point, it is necessary to hold for a long period of time in order to increase the diffusion quantity of potassium ions through the glass surface and the compressive stress layer and stress value are increased with the increase of the treatment time and temperature. When the ion exchange strengthening treatment is carried out at a temperature above the strain point, on the other and, the diffusion of potassium ions is effected more readily and more deeply and the compressive stress layer is more increased with the increase of the treatment time and temperature than in the case of the treatment below the strain point, whilst, on the contrary, the so-called stress relaxation phenomenon takes place whereby the compressive stress value is sharply lowered with the increase of the treatment time and temperature. Therefore, this is disadvantageous in that more precise controlling of the temperature and time during the treatment is required and the operation on a commercial scale is very difficult. Furthermore, in the case of the treatment above the strain point, there takes place on the surface of a glass container treated a glass surface whitening phenomenon resulting from decomposing of potassium nitrate to potassium nitrite.

The concept of the invention has been illustrated above in detail, but the present invention is not limited by this illustration and can of course be modified in practice within the scope of the invention. For example, a coating film of metal oxide such as tin or titanium oxide can be formed on the outer surface of a glass container, in particular, glass bottle which is in a heated state immediately after being formed, that is, before subjecting to the ion exchange strengthening treatment according to the present invention. Such a metal oxide coating having a high abrasion resistance, formed on the outer surface of a glass bottle, serves to protect a compressive stress layer formed on the outer surface by the ion exchange strengthening treatment according to the present invention. In general, when glass containers are handled for example, during inspecting, bottling, capping, packaging and shipment, the glass bottles are brought into contact with each other or with conveyor guides and thus scratched or bruised to break the compressive stress layer formed on the outer surface by the ion exchange treatment often. The formation of such scratches or bruises, i.e., the lowering of the strength of a glass container can be prevented by forming an abrasion resistant coating of such a metal oxide.

The following examples and comparative examples are given in order to illustrate the invention in detail without limiting the same. All parts and percentages, etc. are by weight unless otherwise indicated.

EXAMPLE 1

A glass container having a strain point of 510° C. was formed from an ordinary soda-lime-silica glass consisting of 72% $SiO_2$, 2% $Al_2O_3$, 14% $Na_2O$, 1% $K_2O$, 10% CaO, 0.4% MgO and trace impurities and minor constituents. The formed glass container was passed through a lehr and cooled to room temperature.

Potassium chloride and potassium nitrate were mixed in a proportion of 2:1 by weight and dissolved in warm water at 75° C. to prepare a high concentration aqueous solution (saturated aqueous solution) of the potassium salts, to which a small amount (0.2 to 1.2% by volume) of an anionic surfactant polyoxyethylene sodium alkylsulfate was then added. This aqueous solution was sprayed uniformly onto the inner surface of the glass container at a relatively low temperature (45° to 60° C.) and then the outer surface thereof was sprayed therewith. The glass container was preheated at 130° C. for 30 minutes in a drier and the outer surface thereof was optionally over-sprayed. The thus preheated glass container was subjected to a heat treatment at 505° C. for 60 minutes, cooled and washed. Thin fragments of 300 microns were cut out of this glass container and then subjected to measurement of the compressive stress layer and stress value using a polarization microscope, thus obtaining results as shown in Table 1.

EXAMPLE 2

The procedure of Example 1 was repeated using a mixed salt solution containing potassium chloride and potassium nitrate with a weight ratio of 1:1 to obtain results shown in Table 1.

EXAMPLE 3

The procedure of Example 1 was repeated using a mixed salt solution containing potassium chloride and potassium nitrate with a weight ratio of 3:1 to obtain results shown in Table 1.

EXAMPLE 4

The procedure of Example 1 was repeated using a mixed salt solution containing potassium chloride and potassium nitrate with a weight ratio of 5:1 to obtain results shown in Table 1.

EXAMPLE 5

The procedure of Example 1 was repeated using a mixed salt solution containing potassium sulfate and potassium nitrate with a weight ratio of 1:1 to obtain results shown in Table 1.

EXAMPLE 6

The procedure of Example 1 was repeated using a mixed salt solution containing potassium sulfate and potassium nitrate with a weight ratio of 1:3 to obtain results shown in Table 1.

EXAMPLE 7

The procedure of Example 1 was repeated using a mixed salt solution containing potassium chloride, potassium nitrate and potassium sulfate with a weight ratio of 3:1:1 to obtain results shown in Table 1.

For comparison and reference, the procedure of Example 1 was further repeated using treating solutions containing potassium chloride only, potassium nitrate only, potassium sulfate only and a mixture of potassium chloride and potassium nitrate with a weight ratio of 1:3, thus obtaining results shown in Table 1.

Table 1

| Example No. | Aqueous Salt Solution | | Stress Layer ($\mu$) | Stress Value ($Kg/cm^2$) |
|---|---|---|---|---|
| 1 | $KCl:KNO_3$ (2:1) | Outer Surface | 13 | 993 |
|   |   | Inner Surface | 13 | 890 |
| 2 | $KCl:KNO_3$ (1:1) | Outer Surface | 15 | 1100 |
|   |   | Inner Surface | 15 | 990 |
| 3 | $KCl:KNO_3$ (3:1) | Outer Surface | 13 | 1064 |
|   |   | Inner Surface | 13 | 960 |
| 4 | $KCl:KNO_3$ (5:1) | Outer Surface | 14.5 | 1061 |
|   |   | Inner Surface | 14 | 950 |
| 5 | $K_2SO_4:KNO_3$ (1:1) | Outer Surface | 15.5 | 879 |
|   |   | Inner Surface | 15 | 790 |
| 6 | $K_2SO_4:KNO_3$ (1:3) | Outer Surface | 15.5 | 705 |
|   |   | Inner Surface | 15.5 | 705 |
| 7 | $KCl:KNO_3:K_2SO_4$ (3:1:1) | Outer Surface | 16 | 1182 |
|   |   | Inner Surface | 16 | 1070 |
| Control No. | | | | |
| 1 | KCl only | Outer Surface | 8 | 850 |
|   |   | Inner Surface | 8 | 760 |
| 2 | $KNO_3$ only | Outer Surface | 10 | 700 |
|   |   | Inner Surface | 10 | 630 |
| 3 | $K_2SO_4$ only | Outer Surface | 12 | 930 |
|   |   | Inner Surface | 12 | 837 |
| 4 | $KCl:KNO_3$ (1:3) | Outer Surface | 11 | 780 |
|   |   | Inner Surface | 11 | 702 |

What is claimed is:

1. A method of chemically strengthening a glass container, which comprises first forming a coating film of a metal oxide selected from the group consisting of tin oxide and titanium oxide at an elevated temperature on the outer surface of the glass container and then applying to the outer thus-coated surface and inner surface of the glass container an aqueous solution containing a small amount of a surfactant and a high concentration of mixed potassium salts consisting of potassium nitrate having a relatively low melting point and at least one potassium salt having a relatively high melting point selected from the group consisting of potassium chloride and potassium sulfate in such a proportion that 10 to 80% by weight of the potassium salts be present in a solid phase, when the potassium salts are heated at an ion exchange strengthening treatment temperature in a subsequent step, to prevent the potassium salts, which are fused at said ion exchange temperature to form a solid and liquid phase, from flowing off the surfaces of the glass container, the temperature of the glass container being lower than that of the aqueous solution, thereby depositing out the potassium salts on the outer surface and inner surface of the glass container by virtue of the temperature difference to form a potassium salt adhered layer, then drying, subjecting the glass container to an ion exchange strengthening treatment by holding the glass container at an elevated temperature below the strain point of the glass but as near the strain point as possible for a period of time sufficient to form a compressive stress layer on the outer surface and inner surface of the glass container, cooling the glass container to room temperature and removing the residual potassium salts.

2. The method as claimed in claim 1, wherein the temperature of the high concentration aqueous solution of the mixed potassium salts is in the range of 50° to 75° C. and the temperature of the glass container is lower than the temperature range of the aqueous solution.

3. The method as claimed in claim 1, wherein the glass container is of an ordinary soda-lime glass having a strain point of about 510° C.

4. The method as claimed in claim 1, wherein the composition of the mixed potassium salts is within the shaded portion surrounded by e-f-j-h-g-i-e in the phase diagram of the three component system $KCl$—$KNO_3$—$K_2SO_4$ shown in FIG. 1.

5. The method as claimed in claim 1, wherein the mixed potassium salts consist of potassium chloride and potassium nitrate which composition is within the range of line e-f in FIG. 1.

6. The method as claimed in claim 1, wherein the mixed potassium salts consist of potassium sulfate and potassium nitrate which composition is within the range of line g-h in FIG. 1.

7. The method as claimed in claim 1, wherein the mixed potassium salts consist of potassium sulfate, potassium chloride and potassium nitrate which composition is within the range of line i-j in FIG. 1.

8. The method as claimed in claim 1, wherein the amount of the surfactant is in the range of 0.2 to 1.2% by volume.

9. The method as claimed in claim 1, wherein the aqueous solution of the mixed potassium salts is applied by dipping or spraying.

* * * * *